United States Patent [19]

Kolts

[11] Patent Number: 4,818,745
[45] Date of Patent: Apr. 4, 1989

[54] CATALYST FOR OXIDATION OF CARBON MONOXIDE AND PROCESS FOR PREPARING THE CATALYST

[75] Inventor: John H. Kolts, Bartlesville, Okla.

[73] Assignee: Phillips Petroleum Company, Bartlesville, Okla.

[21] Appl. No.: 94,468

[22] Filed: Sep. 8, 1987

[51] Int. Cl.$^4$ .................. B01J 21/04; B01J 21/10; B01J 23/89

[52] U.S. Cl. .................... 502/327; 502/328; 423/213.5

[58] Field of Search ............... 502/326, 327, 328, 333, 502/334; 423/213.5

[56] References Cited

U.S. PATENT DOCUMENTS

| | | | |
|---|---|---|---|
| 3,023,173 | 2/1962 | Nixon | 252/466 |
| 3,794,588 | 2/1974 | Stiles | 252/462 |
| 3,963,827 | 6/1976 | Acres et al. | 423/239 |
| 4,012,485 | 3/1977 | Meguerian et al. | 502/326 X |
| 4,048,098 | 9/1977 | Koberstein et al. | 502/230 X |
| 4,111,848 | 9/1978 | Torii | 502/333 |
| 4,117,082 | 9/1978 | Matsuyama | 423/247 |
| 4,123,391 | 10/1978 | Noguchi et al. | 252/466 PT |
| 4,239,656 | 12/1980 | Fujitani et al. | 252/462 |
| 4,252,687 | 2/1981 | Dale et al. | 252/455 Z |
| 4,344,905 | 8/1982 | Chilcot | 264/111 |
| 4,388,277 | 6/1983 | Wright | 422/211 |
| 4,451,580 | 5/1984 | Butler et al. | 502/335 |
| 4,490,482 | 12/1984 | Mathieu | 502/339 |
| 4,492,770 | 1/1985 | Blanchard et al. | 502/326 X |
| 4,514,698 | 4/1985 | Blumenthal et al. | 330/4.3 |
| 4,524,051 | 6/1985 | Wright et al. | 423/247 |
| 4,639,432 | 1/1987 | Holt et al. | 502/324 |

FOREIGN PATENT DOCUMENTS

| | | |
|---|---|---|
| 2365233 | 7/1974 | Fed. Rep. of Germany . |
| 7609909 | 11/1977 | France . |
| 1116588 | 6/1968 | United Kingdom . |
| A2028571 | 3/1980 | United Kingdom . |
| A2083687 | 3/1982 | United Kingdom . |
| 2083944 | 3/1982 | United Kingdom . |

OTHER PUBLICATIONS

"Celcor ® Honeycomb Ceramic Catalyst Supports", Corning Glass Works.

"The Catalytic Oxidation of CO for Sealed $CO_2$ Laser Applications", by I. M. Miller et al., ACS Fall Meeting, 1985, Chicago, Division of Colloid and Surface Chemistry, Paper No. 115.

*Primary Examiner*—W. J. Shine
*Attorney, Agent, or Firm*—K. K. Brandes

[57] ABSTRACT

A composition of matter comprising alumina and/or magnesia and Pt and/or Pd has been prepared by a process comprising the step of heating Pt and/or Pd-impregnated alumina and/or magnesia with a reducing gas, in particular free hydrogen, at a temperature of about 550°–700° C. The above composition of matter is used as catalyst in a process for oxidizing CO to $CO_2$, e.g., in a $CO_2$ laser.

31 Claims, 3 Drawing Sheets

CATALYST FOR OXIDATION OF CARBON MONOXIDE AND PROCESS FOR PREPARING THE CATALYST

BACKGROUND OF THE INVENTION

This invention relates to the oxidation of carbon monoxide to carbon dioxide. In another aspect, this invention relates to the catalytic oxidation of carbon monoxide, in particular under conditions suitable for laser applications. In a further aspect, this invention relates to effective CO oxidation catalyst compositions. In still another aspect, this invention relates to a process for preparing CO oxidation catalyst compositions.

The use of catalysts for the oxidation of carbon monoxide to carbon dioxide by reaction with oxygen, in particular at low temperature, is of much interest, e.g., in breathing masks designed to remove CO from inhaled air, and in $CO_2$ lasers for combining CO and $O_2$ formed by dissociation of $CO_2$ during discharge. In the latter application, the presence of $O_2$ is most undesirable because it can cause a breakdown of the electrical field in the laser cavity. Several patents, such as U.S. Pats. Nos. 4,490,482 and 4,639,432 disclose compositions useful as CO oxidation catalysts in $CO_2$ laser applications. However, there is an ever present need to develop new, effective CO oxidation catalyst compositions and/or improved processes for preparing effective CO oxidation catalyst compositions.

SUMMARY OF THE INVENTION

It is an object of this invention to provide a composition of matter which is effective as a catalyst for the oxidation of carbon monoxide with free oxygen. It is another object to provide a process for preparing a composition of matter which is effective as a catalyst for the oxidation of carbon monoxide. It is a further object of this invention to provide an effective process for catalytically oxidizing carbon monoxide. Other objects and advantages will be apparent from the detailed description and the claims.

In accordance with this invention, a process for preparing a composition of matter (from which silica and tin compounds, in particular tin oxides such as $SnO_2$, are substantially absent, and which is suitable and effective as a catalyst composition for the oxidation of carbon monoxide by reaction with free oxygen) comprises the steps of:

(a) contacting (preferably impregnating)

a support material (from which silica and tin compounds, in particular $SnO_2$, are substantially absent) comprising (preferably consisting essentially of) at least one metal oxide (i.e., one or a mixture of two metal oxides) selected from the group consisting of alumina and magnesia with a solution (from which tin compounds are substantially absent) comprising at least one dissolved compound of at least one noble metal selected from the group consisting of platinum and palladium (preferably Pt);

(b) heating the material obtained in step (a) under such conditions as to substantially dry said material obtained in step (a) and to at least partially (preferably substantially) convert said at least one compound of Pt and/or Pd to at least one of oxides of Pt, oxides of Pd, Pt metal and Pd metal; and (c) heating the material obtained in step (b) in a reducing gas atmosphere, preferably a free hydrogen containing gas, more preferably a stream of $H_2$, at a temperature in the range of from about 550° to about 700° C., under such conditions as to activate said material obtained in step (b), i.e, to make the material obtained in step (b) ore active as a catalyst for CO oxidation by reaction with $O_2$.

In a preferred embodiment, heating step (b) is carried out in two sub-steps:

(b1) heating the material obtained in step (a) at a first temperature so as to remove substantially all liquids [i.e., the solvent of the solution used in step (a)] from said material obtained in step (a), and (b2) heating (calcining) the substantially dried material obtained in step (b1) at a second temperature, which is higher than said first temperature, so as to at least partially (preferably substantially) convert said at least one compound of Pt and/or Pd to at least one of oxides of Pt, oxides of Pd, metallic Pt and metallic Pd (i.e., Pt oxide and/or Pd oxide and/or Pt metal and/or Pd metal).

In another preferred embodiment, the solution used in step (a) additionally comprises at least one dissolved compound of iron, which is at least partially (preferably substantially) converted to iron oxide in step (b) or, alternatively, step (b2). In another preferred embodiment, compounds of Co and Mn are substantially absent (besides silica and Sn compounds) from the material obtained in step (c).

Also in accordance with this invention, there is provided a composition of matter (usesful and effective as a catalyst composition for the oxidation of CO with $O_2$), from which silica and tin compounds (in particular tin oxide) are substantially absent, comprising (i) a support material comprising (preferably consisting essentially of) a material selected from the group consisting of alumina, magnesia and mixtures thereof and (ii) at least one noble metal selected from the group consisting of Pt and Pd; said composition of matter having been prepared by the process described above comprising steps (a), (b) and (c) or, alternatively, steps (a), (b1), (b2) and (c). Preferably said composition of matter further comprises (iii) iron oxide. In a more preferred embodiment, the composition of matter consists essentially of components (i), (ii) and (iii).

Further in accordance with this invention, a process for oxidizing carbon monoxide comprises contacting a gas mixture comprising CO and $O_2$ with a catalyst composition (from which silica and tin compounds are substantially absent) comprising at least one of alumina and magnesia and at least one of Pt and Pd; said catalyst composition having been prepared by a process comprising steps (a), (b) and (c) or, alternatively, (a), (b1), (b2) and (c), as defined above, under such conditions as to at least partially (preferably substantially) convert C and $O_2$ to $CO_2$.

Preferably, in the CO oxidation in process of this invention the catalyst composition of this invention (described above) additionally comprises iron oxide (e.g., FeO and/or $Fe_2O_3$ and/or $Fe_3O_4$). Also preferably, compounds of Co and Mn are substantially absent from the catalyst composition. In a preferred embodiment, the CO oxidation process of this invention is carried out at a temperature of about 0°–100° C.

DETAILED DESCRIPTION OF THE INVENTION

Any alumina and/or magnesia containing support material can be used as the support material. Presently preferred are substantially pure alumina (aluminum oxide) and/or magnesia (magnesium oxide), more preferably substantially pure alumina (containing at least about 95 weight-% $Al_2O_3$). These support materials are commercially available. The method of preparation of alumina or magnesia is not considered critical. Generally, first hydroxides and/or hydrated oxides of aluminum and/or magnesium are precipitated from an aqueous solution of dissolved aluminum and/or magnesium compounds by means of a suitable alkaline substance (e.g., are aqueous $NH_3$). Then the precipitate is separated, washed, and finally heated so as to remove water therefrom and to convert the hydroxides to oxides of aluminum and/or magnesium. If mixtures of alumina and magnesia are used, any suitable weight ratio can be used (such as from 1–99 weight-% $Al_2O_3$ and from 99–1 weight-% MgO).

Generally the surface area (determined by the BET/$N_2$ method; ASTM D3037) of alumina and of magnesia (or mixtures hereof) is in the range of from about 10 to about 350 m2/g. Alumina and/or magnesia can have spherical, trilobal, quadrilobal or irregular shape. When alumina spheres are used, their diameter generally is in the range of from about 0.2 to about 20 mm, preferably about 0.5–3 mm. Silica and tin compounds, in particular tin oxides, more particularly tin dioxide, should be substantially absent from the support material (i.e., silica and tin compounds should not be present at a level higher than about 0.5, preferably about 0.2, weight-% each).

It is within the scope of this invention to prepare suitable support materials by coating a honeycomb ceramic material, such as a monolith (commercially available from Corning Glass Works, Corning, NY; described in U.S. Pat. Nos. 4,388,277 and 4,524,051) with alumina and/or magnesia. The monolith can be impregnated with organic compounds of Al and/or Mg (such as trialkyl Al and/or a Grignard reagent), hydrolyzed, dried and calcined. Or the monolith can be impregnated with a dispersion (preferably colloidal) of oxides/hydroxides of Al and/or Mg, followed by drying and calcining.

The impregnation of the support material with Pt and/or Pd (preferably Pt) can be carried out in any suitable manner. First, compounds of Pt and/or Pd are dissolved in a suitable solvent (preferably water) so as to prepare solutions of suitable concentration, generally containing from about 0.005 to about 0.20, preferably about 0.01 to about 0.1, g Pt and/or Pd per cc of solution. Non-limiting examples of suitable compounds of Pt and Pd are: $PtCl_2$, $PtCl_4$, $H_2PtCl_6$, $PtBr_4$, $Pt(HN_3)_4Cl_2$, $Pt(NH_3)_4(NO_3)_2$ and the like; $PdCl_6$, $Pd(NH_3)_4(NO_3)_2$ $Pd(NH_3)_4(NO_3)_2$. The support material is then impregnated by soaking it in the solution of Pt and/or Pd compounds; or (less preferably) the Pt and/or Pd containing solution is sprayed onto the support material. The ratio of Pt and/or Pd solution to support material generally is such that the final catalyst contains about 0.5 to about 5, preferably about 1 to about 3, weight-% Pt or Pd. When a solution containing both Pt and Pd compounds, the level of Pt and Pd generally is about 0.5 to about 5, preferably about 1 to about 3, weight percent (Pt+Pd).

In a preferred embodiment, a compound of iron is also present in the impregnating solution (besides Pt and/or Pd). Non-limiting examples of suitable Fe compounds that can be used as solutes are $FeCl_2$, $FeCl_3$, $Fe_2(SO_4)_3$, $Fe(NO_3)_2$, $Fe(NO_3)_3$ an of Fe in the valence state +3, more preferably $Fe(NO_3)_3$. Generally, the concentration of Fe (expressed as Fe metal) is in the range of from about 0.01 to about 0.4, preferably about 0.02 to about 0.2, g Fe per cc solution. The impregnation of the support material with Pt and/or Pd and Fe can be carried out either by sequential impregnation (first Pt and/or Pd, then Fe) or by simultaneous impregnation in step (a) (using a solution containing Pt and/or Pd compounds and at least one Fe compound).

When sequential impregnation is employed, the impregnation with a solution of at least one Fe compound is carried out after heating step (b) and before step (c). Thus, after step (b) or, alternatively, after step (b2), an impregnating step (a*) with at least one dissolved Fe compound and a subsequent heating step (b*) [carried out in substantially the same manner as step (b)] are performed before step (c). The ratio of Fe containing solution to support material is such as to provide a level of about 0.2 to about 4, preferably about 0.5–2, weight percent Fe.

Compounds of tin are to be substantially absent in the impregnating solutions used in impregnation steps (a) and (a*); and preferably, compounds of cobalt and manganese should also be substantially absent from these solutions since these compounds have a detrimental effect on the activity for CO oxidation of the finished catalyst.

Heating step (b) is generally carried out in an inert or oxidizing atmosphere, preferably a free oxygen containing gas atmosphere (such as air), generally at a temperature ranging from about 30° to about 700° C. Preferably, heating step (b) is carried out in two sequential sub-steps: sub-step (b1), at about 30° to about 200° C. (preferably at about 80°–130° C.), generally for about 0.5 to about 10 hours, so as to substantially dry the impregnated material obtained in step (a) (preferably under such conditions as to reduce the level of adhered and accluded water to less than about 20 weight-%); and sub-step (b2), at about 300° to about 700° C. (preferably about 400° to about 600° C.), generally for about 1 to about 20 hours, under such conditions as to substantially calcine the impregnated support material so as to obtain oxides of Pt and/or Pd, optionally mixed with metallic Pt and/or Pd, on alumina and/or magnesia. When a Fe compound has been present in any of the impregnating solutions, at least one oxide of Fe is formed in heating steps (b) or (b1) or (b*).

Reducing step (c) can be carried out in any suitable manner at a temperature in the range of from about 550° to about 700° C., preferably from about 600° to about 660° C. Any reducing gas can be employed, such as a gas comprising $H_2$, CO, gaseous hydrocarbons such as methane, mixtures of the above, and the like. Preferably, a free hydrogen containing gas, more preferably a hydrogen gas stream, most preferably substantially pure $H_2$, is employed. Reducing step (c) can be carried out for any suitable period of time suitable to activate the calcined material obtained in step (b), or alternatively step (b2), or, if applicable, step (b*), preferably from about 0.5 to about 20 hours.

The process for oxidizing a carbon monoxide containing feed gas can be carried at any suitable temperature and pressure conditions, for any suitable length of time, at any suitable gas hourly space velocity, and any suitable volume ratio of CO and $O_2$. The reaction temperature generally is in the range of from about 0° to about 400° C., preferably from about 0° to about 100° C., more preferably from about 10° to about 50° C.; most preferably about 20°–40° C. The pressure during the oxidation process generally is in the range of from about 1 to about 2,000 psia, preferably from about 5 to about 20 psia. The volume ratio of CO to $O_2$ in the feed gas can range from about 1:100 to about 100:1, and preferably is in the range of from about 1:10 to about 10:1. The volume percentage of CO and the volume percentage of $O_2$ in the feed gas can each be in the range of from about 0.05 to about 50, preferably from about 0.05 to about 3. The gas hourly space velocity (cc feed gas per cc catalyst per hour) can be in the range of from about 0.5 to about 10,000, preferably from about 1 to about 1,000. It is understood that the calculation of the gas hourly space velocity is based on the volume of the active catalyst i.e., the alumina and/or magnesia supported Pt and/or Pd catalyst (optionally also containing iron oxide), excluding the volume occupied by any additional inert support material, such as a monolith, which may be present.

The feed gas can be formed in any suitable manner, e.g., by mixing CO, $O_2$ and, optionally, other gases such as $CO_2$, $N_2$, He and the like, such as in a carbon dioxide laser cavity. Or the feed gas can be an exhaust gas from a combustion engine, or it can be air that is to be inhaled by humans and contains undesirably high levels of toxic carbon monoxide, and the like. The feed gas can be contacted in any suitable vessel or apparatus, such as in a laser cavity or in an exhaust pipe of a combustion engine, or in a gas mask (used by humans), wherein the feed gas passes over the catalyst composition of this invention at the conditions described above. The CO oxidation process of this invention can be carried out in any suitable setting and for any purpose, e.g., to recombine CO and $O_2$ in $CO_2$ lasers, to oxidize CO contained in exhaust gases or in air, to make isotopically labeled $C_2$ from C and the $$^{18}_{8}O$$

isotope, and the like.

The following examples are presented in further illustration of the invention and are not to be construed as unduly limiting the scope of the invention.

EXAMPLE I

The example illustrates the experimental setup for testing the activity of supported noble metal catalysts for catalyzing the oxidation of carbon monoxide at low temperatures (to simulate catalytic recombination of CO and $O_2$ in $CO_2$ lasers). A gaseous feed blend comprising CO, $O_2$, He and $N_2$ was passed through a flow meter, a needle valve and a glass reactor tube in an upflow direction. The glass reactor tube had an inner diameter of about 1.5 cm and generally contained a bed of about 20 cc (10 g) catalyst to be tested. The temperature in the catalyst bed was measured by means of a thermocouple inserted into the top of the catalyst bed. The contents of $O_2$ and CO in the gaseous effluent from the reactor were determined by means of a Hewlett-Packard 5890 gas chromatograph using Porapak Q and molecular sieve columns. The $O_2$ conversion was determined directly from $O_2$ analysis data, and was also calculated from measured CO analysis data.

All tests were carried out at ambient conditions. Generally the temperature in the catalyst bed rose to about 30° C. because of the generation of heat during the CO oxidation tests. The feed rate of the gaseous feed stream generally was about 40–300 cc/minute.

EXAMPLE II

This example illustrates the preparation of alumina-supported catalyst materials and their performance in CO oxidation tests.

200 cc (182 g) of 1/16" spheres of alumina having a BET/$N_2$ surface area of 225 m2/g, provided by Aluminum Company of America (Alcoa), Pittsburgh, PA, were impregnated at room temperature with an aqueous solution of chloroplatinic acid containing 0.027 g Pt/cc.

In order to obtain a catalyst with 2 weight-% Pt, 67.5 cc of the chloroplatinic acid was used for impregnation. For different Pt levels on the catalyst, the amount of chloroplatinic acid solution used was varied accordingly.

After impregnation, the Pt/$Al_2O_3$ catalysts were dried at 125° C. for 2 hours and then calcined in air at 500° C. for 4 hours. Thereafter, the catalysts were pretreated with hydrogen gas for about 14 hours at various temperatures (range: about 260°–650° C.).

Figure 1:
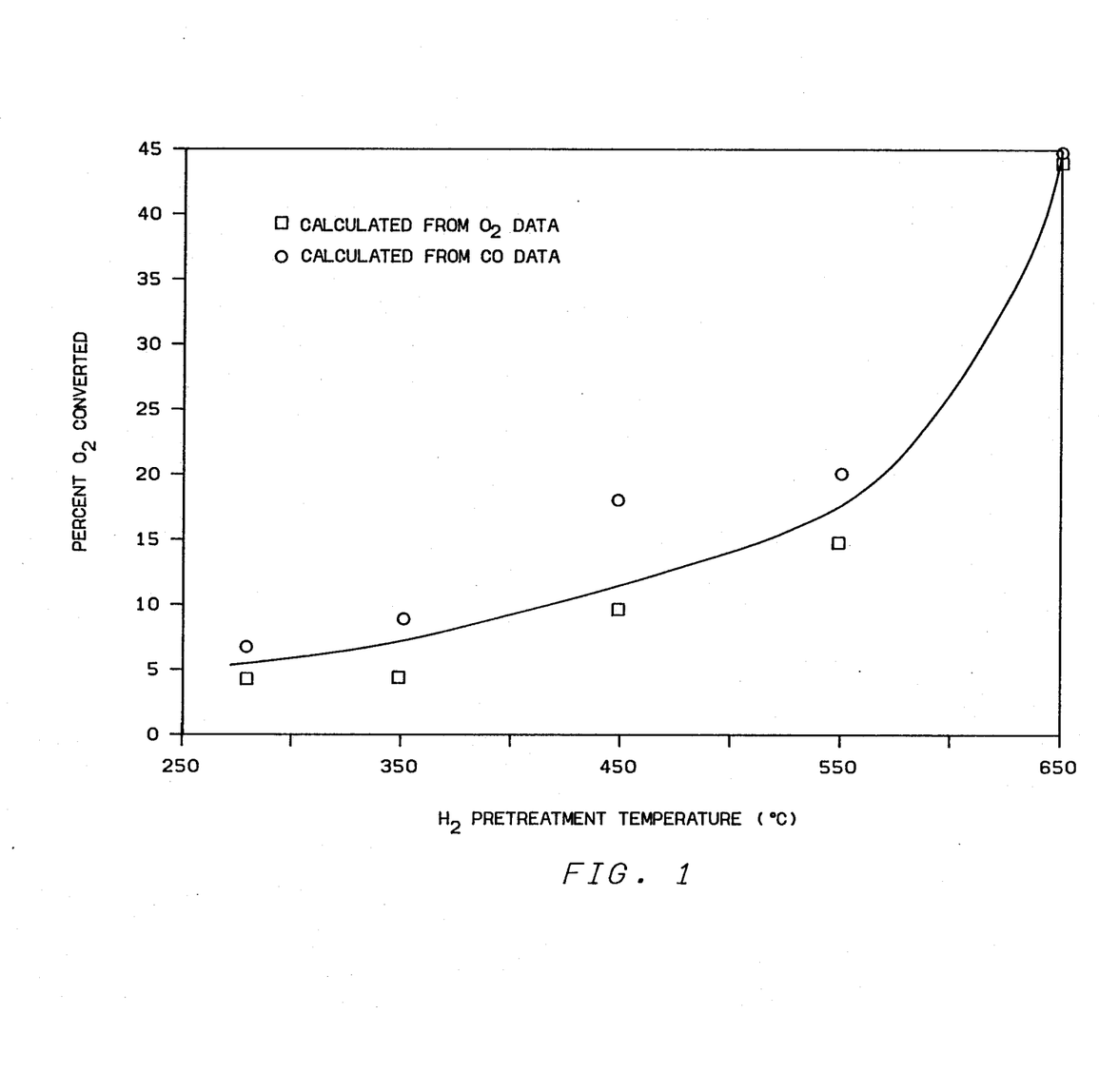
FIG. 1 shows the dependence of $O_2$ conversion (and thus CO conversion) during low temperature oxidation of CO upon the temperature during reducing pretreatment of a $Pt/Al_2O_3$ catalyst in $H_2$.

$Pt/Al_2O_3$ catalysts, which had been pretreated in $H_2$ at different temperatures and contained 2 weight-% Pt, were tested in the CO oxidation unit described in Example I. The gaseous feed blend contained 2.7 volume-% CO, 1.4 volume-% $O_2$, 64.2 volume-% He and 31.7 volume-% $N_2$. The feed rate was about 50 cc/minute. Average $O_2$ conversion attained after about 0.5 hour on stream by using the $Pt/Al_2O_3$ catalysts (containing 2 weight-% Pt) were plotted in FIG. I as a function of the temperature of the catalyst pretreatment with $H_2$ (described above). FIG. I clearly shows that pretreatment of the catalyst with $H_2$ at 550°–650° C. resulted in considerably higher CO oxidation activity than pretreatment with $H_2$ below 550° C.

Figure 2:
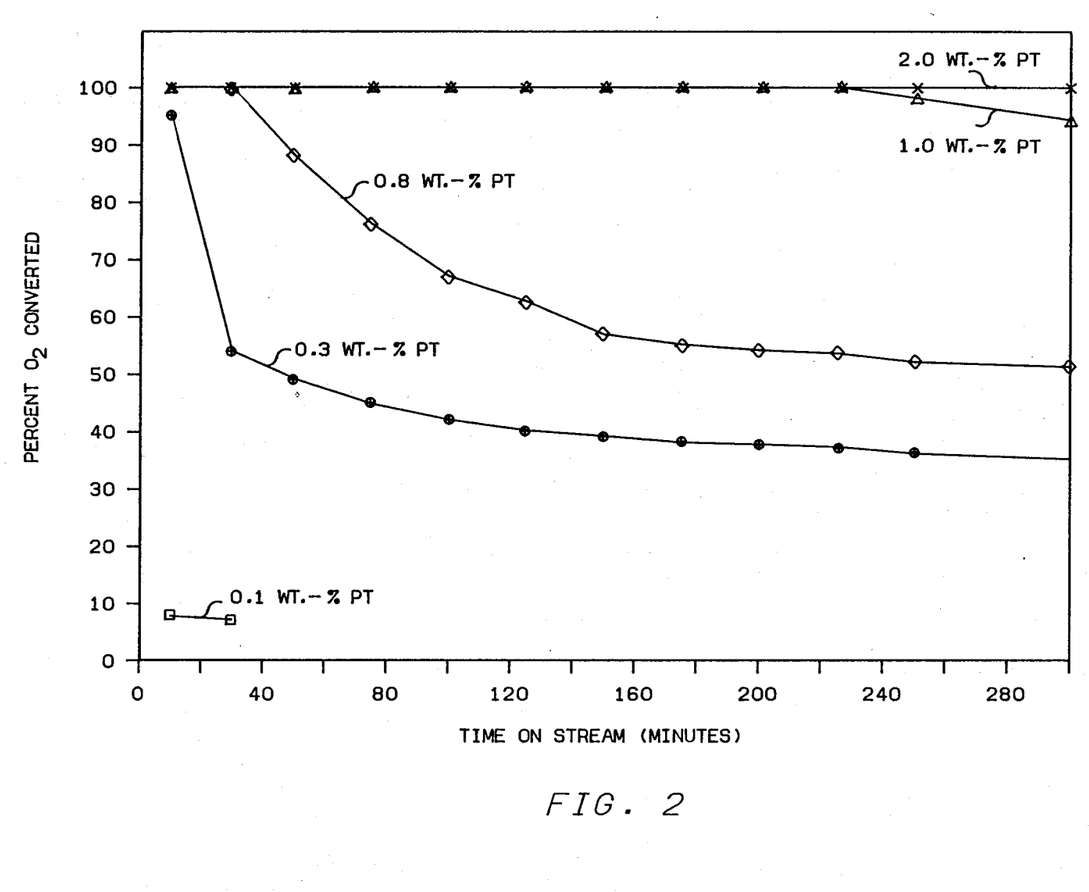
FIG. 2 illustrates the effect of the Pt level in a $Pt/Al_2O_3$ catalyst on its catalytic activity and retention of catalytic activity for the conversion of $O_2$ (and CO) during the low temperature oxidation of CO.

FIG. 2 shows the $O_2$ conversion attained after different reaction times (time on stream) with four alumina-based catalysts having been pretreated in hydrogen at 600° C. for 1 hour and containing different levels of Pt. Graphs in FIG. 2 indicate that a level of 1–2 weight-% Pt gave optimal CO oxidation activity. No appreciable deactivation of these catalyst containing 1–2 weight-% Pt was observed during the first 4–5 hours on stream.

EXAMPLE III

This example illustrates the effect of copromoters on the CO oxidation activity of $Pt/Al_2O_3$ catalysts. 5 gram samples of a catalyst containing 2 weight-% Pt on $Al_2O_3$ were impregnated with 5 ml samples of aqueous solutions containing various dissolved metal salts: (a) 0.17 g manganese(II) nitrate, (b) 0.36 g iron(III) nitrate, and (c) 0.25 g cobalt(II) nitrate, respectively, so as to provide the following catalysts: (A) 1 weight-% Mn+2 weight-% Pt on alumina, (B) 1 weight-% Fe+2 weight-% Pt on alumina and (C) 1 weight-% Co+2 weight-% Pt on alumina. The CO oxidation activity of these catalysts was compared in test runs carried out in the setup described in Example I. The gaseous feed blend contained 1.2 volume-% CO, 0.6 volume-% $O_2$, 57.5 volume-% He and 40.7 volume-% $N_2$. The feed rate was 10 cc/minute.

Figure 3:
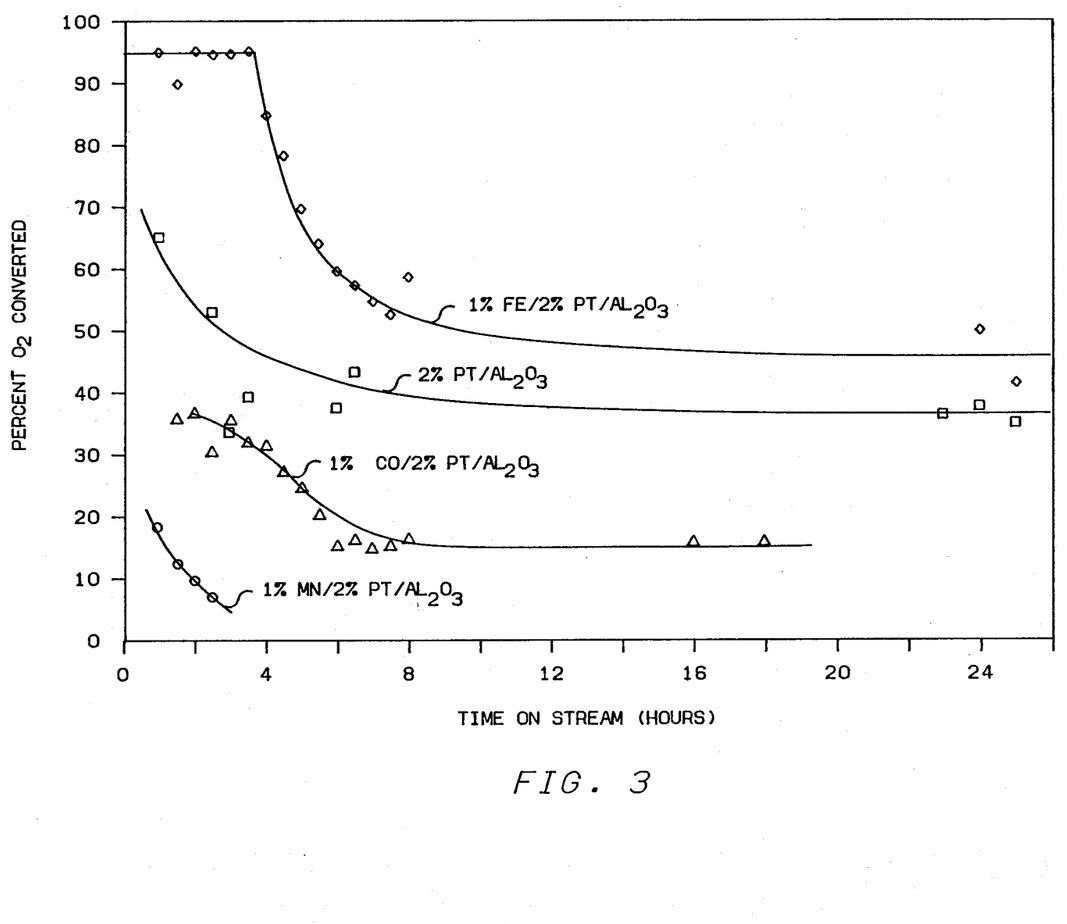
FIG. 3 illustrates the effect of copromoters on the catalytic activity of a $Pt/Al_2O_3$ catalyst when used for low temperature oxidation of CO.

The graphs in FIG. 3 indicate that the addition of Mn and Co to a $Pt/Al_2O_3$ had a deleterious effect on the CO oxidation activity of the catalyst, whereas the addition of Fe as copromoter surprisingly enhanced the performance of the $Pt/Al_2O_3$ catalyst.

In a separate test series, 5 weight-% tin had been added to a catalyst containing 1 weight-% Pt on $Al_2O_3$. The $O_2$ conversion of this catalyst (pretreated in $H_2$ at 660° C.) ranged from about 19% after 0.5 hours on stream to about 5% after 2 hours on stream, whereas the $O_2$ conversion attained with the 1% $Pt/Al_2O_3$ catalyst without Sn at the same conditions was essentially 100%. Thus, substantially no Sn compounds should be present in the $Pt/Al_2O_3$-containing CO oxidation catalysts of this invention.

EXAMPLE IV

This example illustrates the effect of supports other than alumina on the CO oxidation activity of Pt catalysts.

Several catalysts containing 1 weight-% Pt were prepared by impregnation of various support materials with an aqueous solution of chloroplatinic acid (described in Example II), drying and pretreating in hydrogen gas for about 1 hour. These catalysts were tested in a CO oxidation unit at room temperature (see Example I). The gaseous feed contained 2.9 volume-% CO, 1.5 volume-% $O_2$, 32 volume-% He, 32 volume-% $N_2$ and 32 volume-% $C_2$. The feed rate was 50 cc/minute. Test results are summarized in Table I.

TABLE I

| Catalyst Support | Temp. (°C.) of $H_2$ Pretreatment | Minutes on Stream | % Conversion of $O_2$ |
|---|---|---|---|
| $Zn_2Al_2O_4$ | 450 | 30 | 7.2 |
|  | 450 | 63 | 4.5 |
|  | 450 | 112 | 2.4 |
| $Zn_2Al_2O_4$ | 550 | 10 | 20.9 |
|  | 550 | 50 | 3.5 |
|  | 550 | 92 | 0.4 |
| $Zn_2Al_2O_4$ | 670 | 10 | 23.5 |
|  | 670 | 23 | 0 |
|  | 670 | 35 | 0 |
| MgO | 450 | 20 | 14.6 |
|  | 450 | 44 | 12.2 |
|  | 450 | 66 | 8.9 |
| MgO | 560 | 45 | 72.2 |
|  | 560 | 57 | 72.7 |
|  | 560 | 77 | 74.6 |
| MgO | 670 | 40 | 66.1 |
|  | 670 | 75 | 65.9 |
|  | 670 | 153 | 68.2 |
|  | 670 | 180 | 68.7 |
|  | 670 | 228 | 69.8 |
| $SiO_2$ | 660 | 12 | 0 |
|  | 660 | 38 | 0 |

Test data in Table I clearly show that a catalyst containing 1 weight-% Pt on MgO became quite active for catalyzing the oxidation of carbon monoxide when this catalyst was pretreated in $H_2$ at a temperature at 560°–670° C., whereas pretreatment at 450° C. yielded a significantly poorer Pt/MgO catalyst. A zinc aluminate supported Pt catalyst was considerably less active than the MgO-supported catalyst, whereas a silica-supported Pt catalyst showed no activity for catalyzing the oxidation of CO. Thus, silica should be substantially absent from the catalysts of this invention.

In another test series, 25 cc of various catalysts were placed in a 9-liter vessel which contained a gas mixture of 2.9 volume-% CO, 1.5 volume-% $O_2$, 32 volume-% $N_2$, 32 volume-% He and 32 volume-% $CO_2$, at room temperature (about 25° C.) and under a pressure of 10 psig. Gas samples were taken at various time intervals and analyzed. Pertinent test results are summarized in Table II.

TABLE II

| Catalyst | Reaction Time(Hours) | % Conversion of $O_2$ |
|---|---|---|
| 2% $Pt/Al_2O_3$[1] | 1 | 58 |
|  | 2 | 70 |
|  | 3 | 79 |
|  | 4 | 90 |
| 1% $Pt/MgO$[1] | 1 | 26 |

TABLE II-continued

| Catalyst | Reaction Time(Hours) | % Conversion of $O_2$ |
|---|---|---|
|  | 2 | 49 |
|  | 3 | 55 |
| 1% Pt/Charcoal[1] | 1 | 12 |
|  | 2 | 14 |
|  | 3 | 21 |
|  | 4 | 26 |
| Hopcalite[2] | 1 | 46 |
|  | 2 | 70 |

[1] pretreated in $H_2$ at 660° C. for about 1 hour.
[2] a commercial MnO/CuO-containing material, used in gas masks for oxidizing CO to $CO_2$; not pretreated in $H_2$.

Test data in Table II show that the Pt/MgO catalyst of this invention was almost as active as the other catalyst of this invention, Pt/Al$_2$O$_3$. Both catalysts were superior to the Pt/charcoal catalyst. The Pt/Al$_2$O$_3$ catalyst was comparable in a CO oxidation activity to a commercial catalyst, Hopcalite.

EXAMPLE V

This example illustrates the use of supported Pd catalysts for catalyzing the oxidation of CO at room temperature. 1/16" alumina spheres and extrudates, respectively, and zinc aluminate were impregnated with a 10 weight-% solution of tetramminepalladium(II) nitrate in H$_2$O, so as to give a level of 2.0 weight-% Pd, dried at 125° C., calcined in air for 4 hours at 550° C. and pretreated in H$_2$ for 1 hour at 500° C.

20 gram samples of these catalysts were tested at 25° C. for their CO oxidation activity in the apparatus described in Example I. The gaseous feed blend contained 1.6 volume-% O$_2$, 3.0 volume-% CO, 32 volume-% He, 30 volume-% N$_2$ and 33 volume-% CO$_2$, and was introduced at a feed rate of 5.0 cc/minute.

The conversion of O$_2$ per pass ranged from 7% to 12% for 2 weight-% PD on alumina, whereas the O$_2$ conversion under these conditions was only about 3% for 2 weight-% Pd on Zn$_2$TiO$_4$. Based on these test results, it is concluded that Pd/Al$_2$O$_3$ catalysts that are pretreated with hydrogen in accordance with this invention are quite active for catalyzing the oxidation of CO, but are not as active as the corresponding Pt/Al$_2$O$_3$ catalysts described in Examples II and III. Thus Pd/Al$_2$O$_3$ and Pd/MgO catalysts are presently less preferred embodiments of this invention, as compared to Pt/Al$_2$O$_3$ and Pt/MgO catalysts.

Reasonable variations, modifications and adaptations for various usages and conditions can be made within the scope of the disclosure and the appended claims, without departing from the scope of this invention.

That which is claimed is:

1. A process for preparing a composition of matter, which is useful and effective as catalyst composition for CO oxidation and consists essentially of (i) at least one metal oxide selected from the group consisting of alumina and magnesia, (ii) platinum metal and (iii) iron oxide, said process comprising the steps of
    (a) contacting a support material consisting essentially of at least one metal oxide selected from the group consisting of alumina and magnesia with a solution comprising at least one dissolved compound platinum and at least one dissloved iron compound,
    (b) heating the material obtained in step (a) under such conditions as to substantially dry said material obtained in step (a), to substantially convert said at least one compound of platinum to at least one of oxides of Pt and Pt metal and to substantially convert said at least one iron compound to iron oxide; and
    (c) heating the material obtained in step (b) in a reducing gas atmosphere at a temperature in the range of from about 550° to about 700° C., under such conditions as to activate said material obtained in step (b) and to form said composition of matter.

2. A process in accordance with claim 1, wherein said reducing gas atmosphere is a free hydrogen containing gas.

3. A process in accordance with claim 2, wherein said free hydrogen containing gas is a stream of H$_2$.

4. A process in accordance with claim 1, wherein step (c) is carried out in a stream of H$_2$ at a temperature in the range of from about 600° to about 660° C., for a period of time in the range of from about 0.5 to about 20 hours.

5. A process in accordance with claim 1, wherein step (b) is carried out in two sub-steps:
    (b1) heating the material obtained in step (a) at a first temperature so as to remove substantially all liquids from said material obtained in step (a), and
    (b2) heating the substantially dried material obtained in step (b1) in an oxidizing atmosphere at a second temperature, which is higher than said first temperature, so as to substantially convert said at least one compound platinum to at least one of oxides of Pt, and Pt metal and to substantially convert said at least one iron compound to iron oxide.

6. A process in accordance with claim 5, wherein said first temperature is in the range of from about 30° to about 200° C., and said second temperature is in the range of from about 300° to about 700° C.

7. A process in accordance with claim 1, wherein said at least one metal oxide is alumina.

8. A process in accordance with claim 1, wherein said at least one metal oxide is magnesia.

9. A process in accordance with claim 1, wherein said at least one metal oxide is a mixture of alumina and magnesia.

10. A process in accordance with claim 1, wherein said composition of matter comprises about 0.5 to about 5 weight Pt and about 0.2 to about 4 weight-% Fe.

11. A process for preparing a composition of matter, which is useful and effective as a catalyst composition for CO oxidation and consists essentially of (i) at least one metal oxide selected from the group consisting of alumina and magnesia, (ii) platinum metal and (iii) iron oxide, said process comprising the steps of
    (a) contacting a support material consisting essentially of at least one metal oxide selected from the group consisting of alumina and magnesia with a solution comprising at least one dissolved compound of platinum
    (b) heating the material obtained in step (a) under such conditions as to substantially dry said material obtained in step (a), and to at least partially convert said at least one compound of platinum to at least one of oxides of Pt and Pt metal;

(a*) impregnating the material obtained in step (b) with a solution comprising at least one iron compound;

(b*) heating the material obtained in step (a*) under such condtions as to substantially dry said material obtained in step (a*), and to substantially convert said at least one iron compound to iron oxide; and (c) heating the material obtained in step (b*) in a reducing gas atmosphere at a temperature in the range of from about 550° C. to about 700° C., under such conditions as to activate said material obtained in step (b*) and to form said composition of matter.

12. A process in accordance with claim 11, wherein said reducing gas atmosphere is a free hydrogen containing gas.

13. A process in accordance with claim 12, wherein said free hydrogen containing gas is a stream of H$_2$.

14. A process in accordance with claim 11, wherein step (c) is carried out in a stream of H$_2$ at a temperature in the range of from about 600° to about 660° C., for a period of time in the range of from about 0.5 to about 20 hours.

15. A process in accordance with claim 11, wherein step (b) is carried out in two sub-steps:
(b1) heating the material obtained in step (a) at a first temperature so as to remove substantially all liquids from said material obtained in step (a), and
(b2) heating the substantially dried material obtained in step (b1) in an oxidizing atmosphere at a second temperature, which is higher than said first temperature, so as to at least partially convert said at least one compound of platinum to at least one of oxides of Pt and Pt metal.

16. A process in accordance with claim 15, wherein said first temperature is in the range of from about 30° to about 200° C., and said second temperature is in the range of from about 300° to about 700° C.

17. A process in accordance with claim 11, wherein said at least one metal oxide is alumina.

18. A process in accordance with claim 11, wherein said at least one metal oxide is magnesia.

19. A process in accordance with claim 11, wherein said at least one metal oxide is a mixture of alumina and magnesia.

20. A process in accordance with claim 11, wherein said composition of matter comprises about 0.5 to about 5 weight-% Pt and about 0.2 to about 4 weight-% Fe.

21. A composition of matter, which is useful and effective as a catalyst composition for CO oxidation, consisting essentially of
(i) at least one metal oxide selected from the group consisting of alumina and magnesia,
(ii) platinum metal, and
(iii) iron oxide.

22. A composition of matter in accordance with claim 21, wherein said composition of matter has been activated by heating in a reducing gas atmosphere at a temperature in the range of from about 550 to about 700° C.

23. A composition of matter in accordance with claim 21, having been prepared by a process comprising the steps of
(a) contacting a support material consisting essentially of at least one metal oxide selected from the group consisting of alumina and magnesia with a solution comprising at least one dissolved compound of platinum and at least one dissolved iron compound, (b) heating the material obtained in step (a) under such conditions as to substantially dry said material obtained in step (a), to substantially convert said at least one compound of at least one noble metal to at least one compound of platinum to at least one of oxides of Pt and Pt metal, and to substantially convert said at least one iron compound to iron oxide; and (c) heating the material obtained in step (b) in a reducing gas atmosphere at a temperature in the range of from about 550° to about 700° C., under such conditions as to activate said material obtained in step (b) and to form said composition of matter.

24. A composition of matter in accordance with claim 23, wherein said reducing gas atmosphere is a free hydrogen containing gas.

25. A composition of matter in accordance with claim 21, having been prepared by a process comprising the steps of
(a) contacting a support material consisting essentially of at least one metal oxide selected from the group consisting of alumina and magnesia with a solution comprising at least one dissolved compound of platinum;

(b) heating the material obtained in step (a) under such conditions as to substantially dry said material obtained in step (a), and to at least partially convert said at least one compound of platinum to at least one of oxides of Pt and Pt metal;

(a*) impregnating the material obtained in step (b) with a solution comprising at least one iron compound;

(b*) heating the material obtained in step (a*) under such conditions as to substantially dry said material obtained in step (a*), and to substantially convert said at least one iron compound to iron oxide; and (c) heating the material obtained in step (b*) in a reducing gas atmosphere at a temperature in the range of from about 550° C. to about 700° C., under such conditions as to activate said material obtained in step (b*) and to form said composition of matter.

26. A composition of matter in accordance with claim 25, wherein said reducing gas atmosphere is a free hydrogen containing gas atmosphere.

27. A composition of matter in accordance with claim 21, wherein said at least one metal oxide is alumina.

28. A composition of matter in accordance with claim 21, wherein said at least one metal oxide is magnesia.

29. A composition of matter in accordance with claim 21, wherein said at least one metal oxide is a mixture of alumina and magnesia.

30. A composition of matter in accordance with claim 21 comprising about 0.5 to about 5 weight-% Pt and about 0.2 to about 4 weight-% Fe.

31. A composition of matter in accordance with claim 21 comprising about 1 to about 3 weight-% Pt and about 0.5 to about 2 weight-% Fe.

* * * * *

UNITED STATES PATENT AND TRADEMARK OFFICE
CERTIFICATE OF CORRECTION

PATENT NO. : 4,818,745

DATED : April 4, 1989

INVENTOR(S) : John H. Kolts

It is certified that error appears in the above-identified patent and that said Letters Patent is hereby corrected as shown below:

Claim 1, column 9, line 67, insert --- of --- before "platinum".

Claim 5, column 10, line 33, insert --- of --- after "compound"; and in line 34, insert --- , --- after "metal".

Claim 11, column 10, line 63, add --- ; --- after "platinum".

Claim 23, column 12, line 8, delete "at least one noble metal to at"; and in line 9, delete "least one compound of".

Signed and Sealed this
Second Day of January, 1990

*Attest:*

JEFFREY M. SAMUELS

*Attesting Officer*    *Acting Commissioner of Patents and Trademarks*